United States Patent
Hasama et al.

(10) Patent No.: US 9,759,262 B2
(45) Date of Patent: Sep. 12, 2017

(54) ROLLING BEARING APPARATUS

(71) Applicant: JTEKT CORPORATION, Osaka-shi, Osaka (JP)

(72) Inventors: Kenta Hasama, Kashiwara (JP); Hajime Watanabe, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/168,951

(22) Filed: May 31, 2016

(65) Prior Publication Data

US 2016/0356315 A1  Dec. 8, 2016

(30) Foreign Application Priority Data

Jun. 5, 2015  (JP) ................................. 2015-114947

(51) Int. Cl.
*F16C 33/66* (2006.01)
*F16C 19/54* (2006.01)

(52) U.S. Cl.
CPC ........ *F16C 33/6659* (2013.01); *F16C 19/548* (2013.01); *F16C 33/664* (2013.01); *F16C 33/6681* (2013.01)

(58) Field of Classification Search
CPC .................... F16C 33/6659; F16C 33/6655
See application file for complete search history.

(56) References Cited

U.S. PATENT DOCUMENTS

| 7,883,271 | B2* | 2/2011 | Suzuki | .................... F16C 19/14 |
| | | | | 384/462 |
| 9,377,053 | B2* | 6/2016 | Ito | ........................ F16C 33/664 |
| 9,488,226 | B2* | 11/2016 | Watanabe | ........... F16C 33/6655 |
| 2006/0165328 | A1 | 7/2006 | Ueno et al. | |
| 2007/0071382 | A1* | 3/2007 | Suzuki | ............... F16C 33/6674 |
| | | | | 384/462 |
| 2014/0341490 | A1* | 11/2014 | Ito | ...................... F16C 33/6607 |
| | | | | 384/471 |

FOREIGN PATENT DOCUMENTS

| JP | 2004-108388 A | 4/2004 |
| JP | 2011-033085 A | 2/2011 |

* cited by examiner

*Primary Examiner* — Thomas R. Hannon
(74) *Attorney, Agent, or Firm* — Oliff PLC

(57) ABSTRACT

A rolling bearing apparatus includes a bearing portion and a lubrication unit. The lubrication unit is provided adjacently to an annular space in an axial direction. The annular space is formed between an inner ring and an outer ring, and the lubrication unit has a tank storing lubricant that is supplied to the annular space. The tank has an outer wall on a radially outer side, and a space formed on a radially inner side of the outer wall is a storage portion for storing the lubricant. An oil supply hole that is used to refill the storage portion with the lubricant is provided passing through the outer wall. The oil supply hole is open to the radially outer side.

6 Claims, 3 Drawing Sheets

ROLLING BEARING APPARATUS

INCORPORATION BY REFERENCE

The disclosure of Japanese Patent Application No. 2015-114947 filed on Jun. 5, 2015 including the specification, drawings and abstract, is incorporated herein by reference in its entirety.

BACKGROUND OF THE INVENTION

1. Field of the Invention

The present invention relates to a rolling bearing apparatus including a bearing portion and a lubrication unit that supplies a slight amount of lubricant to the bearing portion.

2. Description of Related Art

Rolling bearings are used, for example, as spindle bearings of machine tools. As shown in FIG. 4, a housing 90 of a spindle unit of a machine tool houses a plurality of rolling bearings 91 provided along an axial direction. The spindle unit shown in FIG. 4 uses oil-air lubrication to ensure appropriate lubrication of the rolling bearings 91. However, the oil-air lubrication involves high running costs due to air consumption. In addition, the oil-air lubrication needs incidental facilities such as an oil-air supply apparatus and an air clean unit, possibly leading to high facility costs.

As another means for lubricating the rolling bearings 91, a rolling bearing apparatus (hereinafter, referred to as the bearing apparatus) incorporating a lubrication unit described, for example, in Japanese Patent Application Publication No. 2004-108388 (JP 2004-108388 A) is known. In this bearing apparatus, the lubrication unit is installed on an inner periphery of an outer ring of a rolling bearing. The rolling bearing (bearing portion) and the lubrication unit are integrated together. The lubrication unit includes a tank, a pump, and so forth. The tank stores lubricant. The pump discharges the lubricant in the tank into an annular space between an inner ring and the outer ring.

By using the bearing apparatus described in JP 2004-108388 A instead of the rolling bearings 91 of the spindle unit of the machine tool shown in FIG. 4, it is possible to overcome the problem of costs attributable to the oil-air lubrication.

However, the bearing apparatus having the lubrication unit is housed in the housing 90 and the lubrication unit contains the tank storing the lubricant. Thus, when maintenance is performed to refill the tank with the lubricant, the spindle unit as shown in FIG. 4 is required to be disassembled to take out the bearing apparatus from the housing 90. This may take a longer time for the maintenance, adversely affecting productivity.

SUMMARY OF THE INVENTION

An object of the present invention is to allow refilling a rolling bearing apparatus with lubricant without disassembling the whole unit containing the rolling bearing apparatus and taking out the rolling bearing apparatus.

According to an aspect of the present invention, a rolling bearing apparatus includes a bearing portion having an inner ring, an outer ring, a plurality of rolling elements interposed between the inner ring and the outer ring, and a cage holding the rolling elements. The rolling bearing apparatus also includes a lubrication unit provided adjacently to an annular space in an axial direction. The annular space is formed between the inner ring and the outer ring, and the lubrication unit has a tank storing lubricant that is supplied to the annular space. The tank has an outer wall on a radially outer side. A space formed on a radially inner side of the outer wall is a storage portion for storing the lubricant. An oil supply hole that is used to refill the storage portion with the lubricant is provided so as to pass through the outer wall. The oil supply hole is open to the radially outer side.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
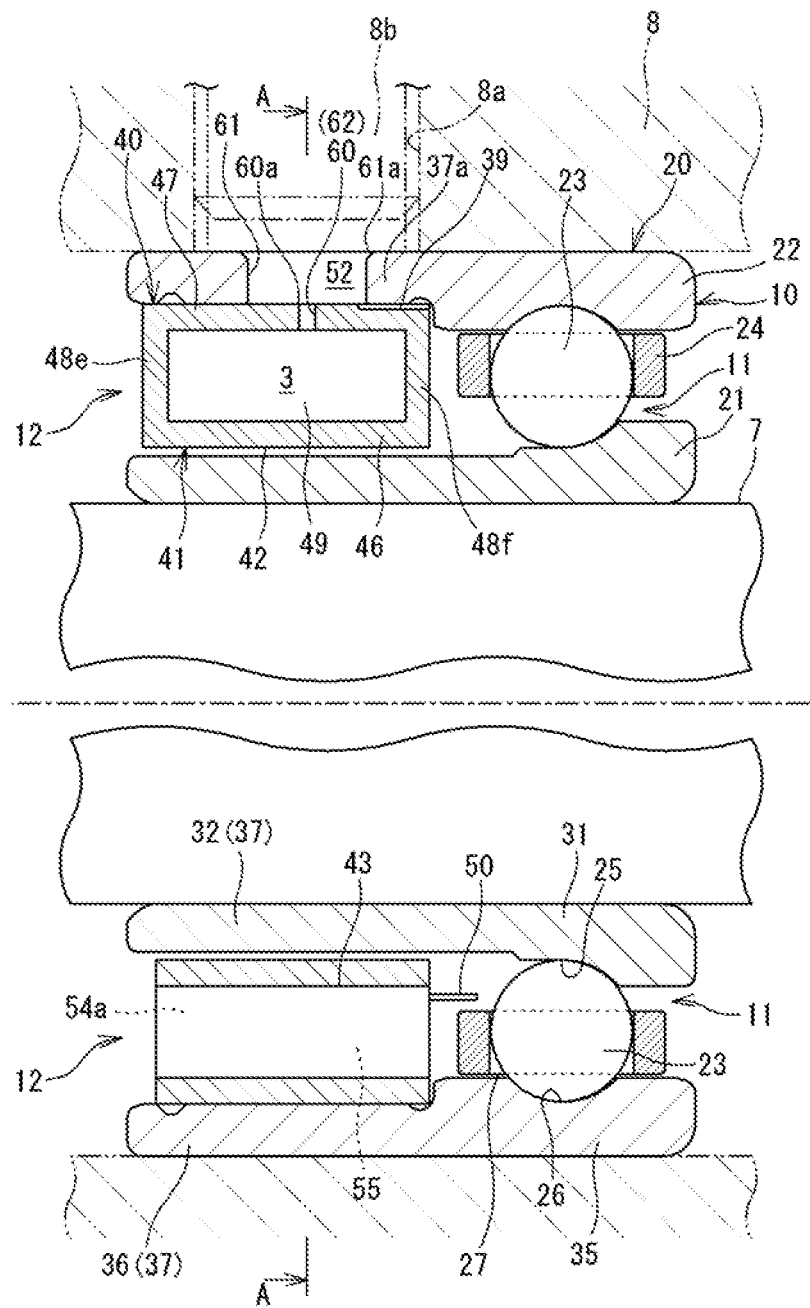
FIG. 1 is a vertical sectional view of a rolling bearing apparatus.

Hereinafter, an embodiment of a rolling bearing apparatus of the present invention will be described. FIG. 1 is a vertical sectional view of a rolling bearing apparatus 10. The rolling bearing apparatus 10 (hereinafter referred to as the bearing apparatus 10) of the present embodiment supports a spindle (shaft 7) of a spindle unit of a machine tool so that the shaft 7 is rotatable. The bearing apparatus 10 is housed in a bearing housing 8 of the spindle unit. In FIG. 1, the bearing housing 8 is illustrated with long dashed double-short dashed lines. The bearing apparatus 10 includes a bearing portion 20 and a lubrication unit 40.

The bearing portion 20 has an inner ring 21, an outer ring 22, a plurality of balls (rolling elements) 23, and a cage 24 holding the balls 23. The inner ring 21 is a cylindrical member externally fitted over the shaft 7. The inner ring 21 has an inner ring main body portion 31 on a first side in an axial direction (in FIG. 1, the right side) and an inner ring extension portion 32 on a second side in the axial direction (in FIG. 1, the left side). In an outer periphery of the inner ring main body portion 31, a raceway groove (hereinafter referred to as an inner ring raceway groove 25) is formed. In the present embodiment, the inner ring main body portion 31 and the inner ring extension portion 32 are integrated together and are indivisible, but may be separated from each other. In a case where the inner ring extension portion 32 is separated from the inner ring main body portion 31, the inner ring extension portion 32 is a short-cylinder-shaped spacer.

The outer ring 22 is a cylindrical member fixed on an inner peripheral surface of the bearing housing 8. The outer ring 22 has an outer ring main body portion 35 on the first side in the axial direction (in FIG. 1, the right side) and an outer ring extension portion 36 on the second side in the axial direction (in FIG. 1, the left side). In an inner periphery of the outer ring main body portion 35, a raceway groove (hereinafter referred to as an outer ring raceway groove 26) is formed. In the present embodiment, the outer ring main body portion 35 and the outer ring extension portion 36 are integrated together and are indivisible, but may be separated from each other. In the case where the outer ring extension portion 36 is separated from the outer ring main body portion 35, the outer ring extension portion 36 is a short-cylinder-shaped spacer.

The balls 23 are interposed between the inner ring 21 (inner ring main body portion 31) and the outer ring 22 (outer ring main body portion 35), and roll in the inner ring raceway groove 25 and the outer ring raceway groove 26. The cage 24 is formed of an annular member and has a plurality of pockets 27 formed along a circumferential direction. Each of the balls 23 is held in corresponding one of the pockets 27. Thus, the cage 24 can hold the plurality of balls 23 so that the balls 23 are arranged in the circumferential direction.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are contiguous with each other. The balls 23 and the cage 24 are arranged in the first annular space 11. The lubrication unit 40 is arranged in the second annular space 12. The inner ring extension portion 32 and the outer ring extension portion 36 defining the second annular space 12 serve as a frame body 37 that contains a tank 42 of the lubrication unit 40 described later.

In the present embodiment, the inner ring 21 rotates along with the shaft 7 with respect to the outer ring 22. The lubrication unit 40 is fitted on and attached to an inner peripheral surface of the outer ring extension portion 36 in a close contact manner. In addition, a small clearance is provided between an outer peripheral surface of the inner ring extension portion 32 and an inner peripheral surface of the lubrication unit 40 (an annular holder 41 described later). This prevents the lubrication unit 40 from hindering the rotation of the inner ring 21.

Figure 2:
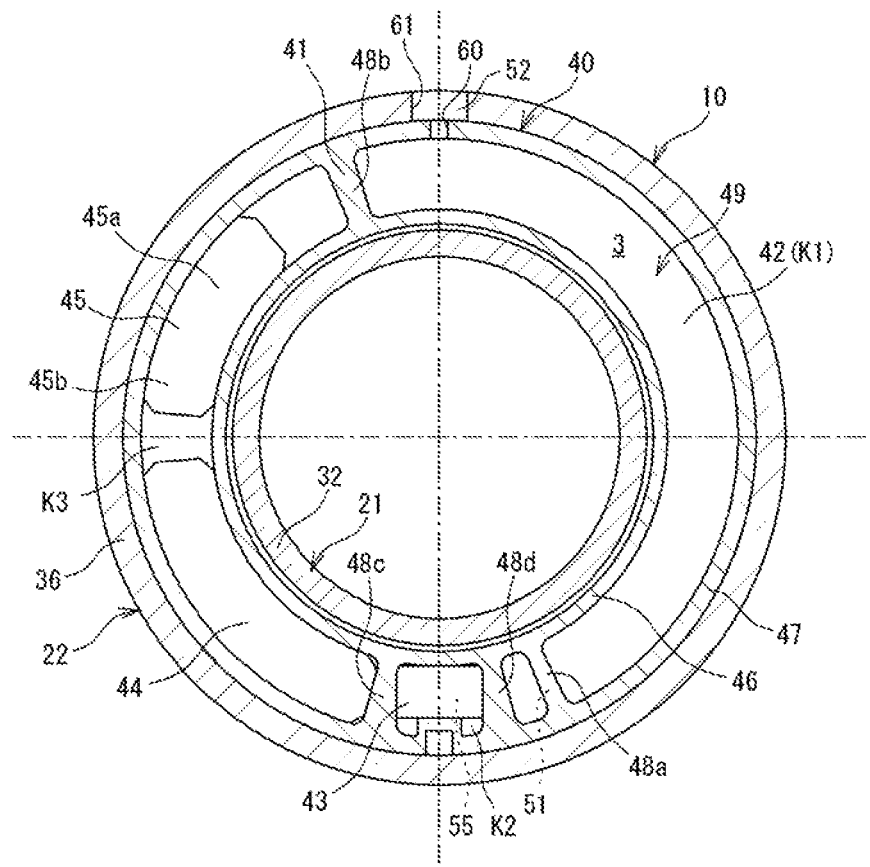
FIG. 2 is a cross sectional view of the rolling bearing apparatus shown in FIG. 1.

FIG. 2 is a sectional view taken along arrows A-A of FIG. 1. The lubrication unit 40 is generally shaped like a ring. The lubrication unit 40 includes the holder 41, the tank 42, and a pump 43. The lubrication unit 40 further includes a circuit section 44 and a power supply section 45.

The holder 41 is, for example, an annular member made of resin. The holder 41 has a short-cylinder-shaped inner wall 46, a short-cylinder-shaped outer wall 47, a plurality of partition walls 48a, 48b, 48c, 48d, and sidewalls 48e, 48f (see FIG. 1). The partition walls 48a, 48b, 48c, 48d are provided between the inner wall 46 and the outer wall 47. As shown in FIG. 2, these walls define a plurality of spaces K1, K2, and K3 along the circumferential direction.

In the present embodiment, the first space K1 forms the tank 42, the second space K2 contains the pump 43, and the third space K3 contains the circuit section 44 and the power supply section 45. Thus, the holder 41, the tank 42, the pump 43, the circuit section 44, and the power supply section 45 are integrated to form the lubrication unit 40. This lubrication unit 40 is attached to the outer ring extension portion 36 and integrated with the bearing portion 20. As shown in FIG. 1, the lubrication unit 40 is provided in the second annular space 12 so as to be adjacent to the first annular space 11 in the axial direction.

In FIG. 1, the tank 42 stores the lubricant 3 to be supplied to the first annular space 11, and has a storage portion 49 for storing the lubricant 3. In the present embodiment, as shown in FIG. 2, the storage portion 49 is a space surrounded by a part of the inner wall 46, a part of the outer wall 47, the partition walls 48a and 48b, and the sidewalls 48e and 48f (see FIG. 1). The sidewall 48e may be detachable.

The tank 42 has, in a part thereof, an outlet portion 51 (see FIG. 2) through which the lubricant 3 stored in the storage portion 49 flows out to the pump 43. The outlet portion 51 and the pump 43 are connected to each other through a channel (not shown). In the tank 42, a holding element (for example, a felt or a sponge) holding the lubricant 3 may be provided. Thus, the tank 42 can store the lubricant 3 and supply the stored lubricant 3 to the pump 43.

In FIG. 1, the pump 43 is used to discharge the lubricant 3 supplied from the tank 42 into the first annular space 11. The pump 43 of the present embodiment has a piezoelectric element 55. The operation of the piezoelectric element 55 can change the volume of an internal space 54a of the pump 43 to discharge the lubricant 3 of the internal space 54a via a nozzle 50.

In FIG. 2, the power supply section 45 has a power generating section 45a and a secondary battery section 45b. The power generating section 45a is configured so that the rotation of the inner ring 21 enables the power generating section 45a to generate electric power. The generated electric power is stored in the secondary battery section 45b. The circuit section 44 includes a circuit board including a programmed microcomputer, and transmits control signals (driving signals) to the pump 43. That is, the circuit section 44 provides driving electric power (applies a predetermined voltage) to the piezoelectric element 55.

The tank 42 will be further described. In FIG. 1, the tank 42 has the outer wall 47 formed on a radially outer side, as described above. The storage portion 49 storing the lubricant 3 is a space formed on a radially inner side of the outer wall 47. The outer wall 47 is provided with an oil supply hole 60. The oil supply hole 60 can be used to refill the storage portion 49 with the lubricant 3, for example, during maintenance. The oil supply hole 60 passes through the outer wall 47 in a radial direction. Thus, the oil supply hole 60 is open toward the radially outer side.

Figure 3:
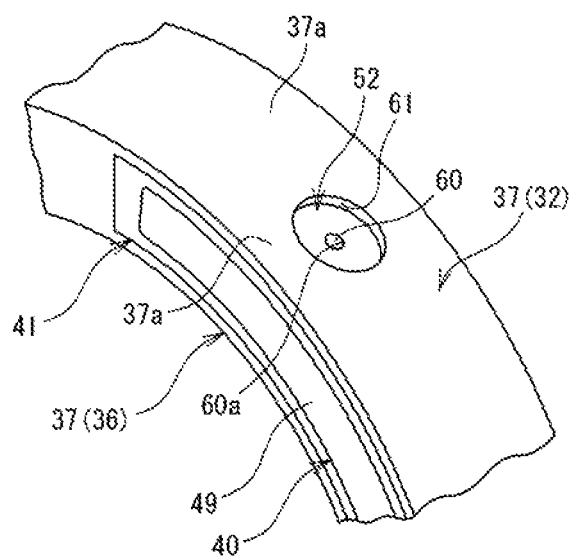
FIG. 3 is a perspective view showing part of a lubrication unit.
Figure 4:
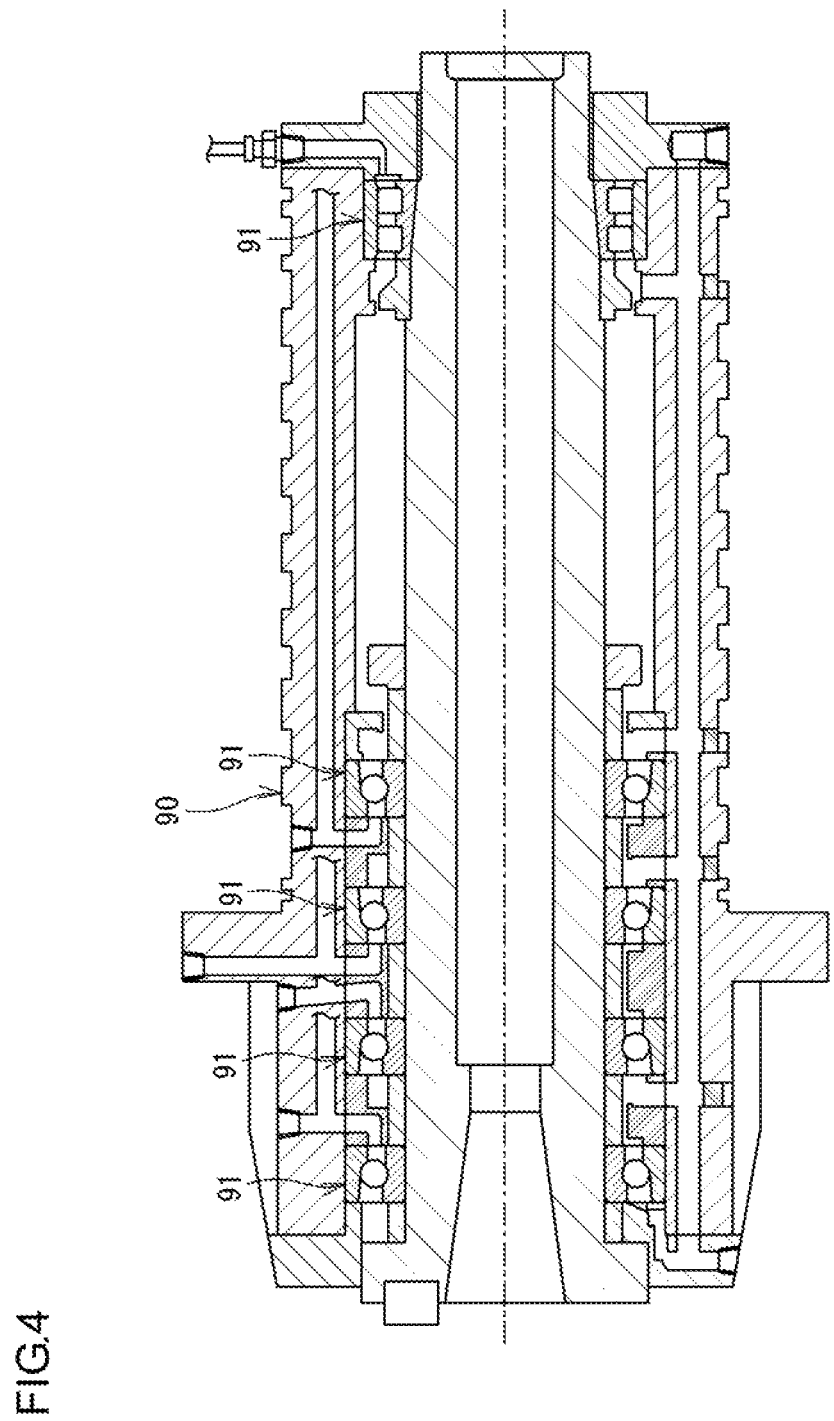
FIG. 4 is a vertical sectional view of a conventional spindle unit.

As described above, the bearing apparatus 10 of the present embodiment has the inner ring extension portion 32 and the outer ring extension portion 36. The inner ring extension portion 32 and the outer ring extension portion 36 each serve as the frame body 37 that houses the tank 42 of the lubrication unit 40. A peripheral wall 37a of the outer frame body 37 (outer ring extension portion 36) is provided with a through-hole 61 (see FIG. 3). FIG. 3 is a perspective view showing part of the lubrication unit 40.

As shown in FIGS. 1 and 3, the through-hole 61 is provided in the peripheral wall 37a of the frame body 37 so as to pass through the peripheral wall 37a in the radial direction. The through-hole 61 is open toward the radially outer side. The size (diameter) of the through-hole 61 is larger than that of the oil supply hole 60, and thus the oil supply hole 60 is open within the opening area of the through-hole 61. That is, the through-hole 61 is a hole that exposes a radially outer opening portion 60a of the oil supply hole 60 to the outside. Hereinafter, a space surrounded by an inner peripheral surface of the through-hole 61 is referred to as "radially outer space 52" of the lubrication unit 40. The radially outer space 52 communicates with the storage portion 49 through the oil supply hole 60.

In the present embodiment, the holder 41 that forms the tank 42 is housed in the frame body 37 (outer ring extension portion 36) to incorporate the lubrication unit 40 into the bearing apparatus 10. In this case, the oil supply hole 60 needs to be opened within the range of the through-hole 61. As described above, since the diameter of through-hole 61 is larger than that of the oil supply hole 60, the oil supply hole 60 can be easily opened within the range of the through-hole 61 during assembling. The diameter of the oil supply hole 60 may be 1 mm or less. In contrast, the diameter of the through-hole 61 may be ten times the diameter of the oil supply hole 60.

In FIG. 1, the outer ring extension portion 36 (frame body 37) in which the through-hole 61 is formed is provided on an inner periphery side of the bearing housing 8. This bearing housing 8 is provided with a screw hole 8a, which passes through the bearing housing 8 in the radial direction. A plug (plug member) 8b is detachably fitted in the screw hole 8a. Although not shown, the screw hole 8a is open in an outer peripheral surface of the bearing housing 8. This opening portion is exposed to the outside of the spindle unit. While the plug 8b is fitted in the screw hole 8a, the radially outer space 52 is closed. When the plug 8b is removed, the radially outer space 52 is opened. Even while the plug 8b is fitted in the screw hole 8a, the radially outer space 52 is not hermetically sealed, and thus the outside air can flow into the radially outer space 52 through a clearance. The diameter of the screw hole 8a is larger than that of the through-hole 61, and thus the through-hole 61 is open within the opening area of the screw hole 8a. That is, the screw hole 8a is a hole that exposes a radially outer opening portion 61a of the through-hole 61 to the outside.

With the above configuration, the opening portion 60a of the oil supply hole 60 inside the screw hole 8a and the through-hole 61 in the radial direction of the bearing apparatus 10 can be exposed to the outside of the spindle unit by removing the plug 8b, during maintenance of the spindle unit (bearing apparatus 10). The storage portion 49 can be refilled with the lubricant 3 through the oil supply hole 60. This refilling can be performed with an injector. Thus, the tank 42 can be refilled with the lubricant 3 without removing, for example, the shaft 7 from the whole spindle unit containing the bearing apparatus 10 and taking out the bearing apparatus 10 (lubrication unit 40). This facilitates maintenance work to refill the tank 42 with the lubricant 3.

In the lubrication unit 40 of the present embodiment, the tank 42 is provided with an air hole 62 that allows the storage portion 49 and the outside of the tank 42 to communicate with each other. In the present embodiment, the air hole 62 is provided in the outer wall 47 of the tank 42. The air hole 62 serves also as the oil supply hole 60. The air hole 62 allows the storage portion 49 and the radially outer space 52 to communicate with each other. Long-term use of the bearing apparatus 10 consumes the lubricant of the tank 42 and empties the storage portion 49. However, the air hole 62 can prevent the negative pressure in the storage portion 49 caused by the lubricant 3 flowing out of the tank 42. In addition, it is not preferred that many holes are provided in the tank 42 in light of preventing foreign matters from entering the tank 42 and the lubricant 3 from leaking from the tank 42, as much as possible. According to the present embodiment, since the air hole 62 serves also as the oil supply hole 60, many holes need not to be provided in the tank 42.

The bearing apparatus 10 of the present embodiment has a channel 39 that allows the radially outer space 52, to which the oil supply hole 60 is open, and the first annular space 11 to communicate with each other. The channel 39 shown in FIG. 1 is a linear groove formed between the outer wall 47 and the peripheral wall 37a of the frame body 37, on the first annular space 11 side. This groove is formed in the outer wall 47, but may be formed in the peripheral wall 37a. One end of the channel 39 is open in the radially outer space 52, and the other end is open in the first annular space 11. This allows the air to flow from the first annular space 11 to the radially outer space 52 and therefore to flow from the first annular space 11 to the storage portion 49 through the radially outer space 52 and the air hole 62 (oil supply hole 60).

The channel 39 has a following function. In the spindle unit of the machine tool having the bearing apparatus 10, purge gas is supplied to a portion of the bearing portion 20 on the first side in the axial direction (in FIG. 1, the right side) in order to prevent foreign matters from entering the bearing portion 20. This increases the pressure (internal pressure) of the first annular space 11, and the pressure may fluctuate in a short time due to variation of the rotational speed of the inner ring 21. If the channel 39 was not formed, the air cannot flow between the first annular space 11 and the storage portion 49 and the pressure (internal pressure) of the storage portion 49 therefore does not change in the short time (that is, cannot follow the pressure fluctuation of the annular space 11). Thus, if the pressure of the first annular space 11 increases and fluctuates in a short time with the pressure of the storage portion 49 not changed, that is, if the pressure of a space to which the lubricant 3 is discharged becomes higher than the pressure of the storage portion 49, the supply of the lubricant 3 from the tank 42 and the pump 43 to the first annular space 11 may be impaired due to the pressure difference.

In the present embodiment, however, the channel 39 allows the storage portion 49 and the first annular space 11 to communicate with each other. The air can accordingly flow between the storage portion 49 and the first annular space 11, and thus cancel the pressure difference between the storage portion 49 and the first annular space 11 even when the pressure fluctuation occurs in the first annular space 11. Thus, the channel 39 can prevent insufficient supply of the lubricant 3 caused by the pressure difference.

In particular, the channel 39 of the present embodiment is the groove formed between the outer wall 47 of the tank 42 and the frame body 37 (outer ring extension portion 36), on the first annular space 11 side. This allows a simple structure and a short length of the channel 39 that connects the first annular space 11 and the radially outer space 52. Thus, the ability of the storage portion 49 to follow the pressure fluctuation of the first annular space 11 is improved.

The above described embodiment is illustrative, and thus is not intended to limit the invention. To be specific, the rolling bearing apparatus 10 of the present invention is not limited to the form shown in the figures, and may be implemented in other forms within the scope of the invention. In the embodiment above, the inner ring 21 is a rotating ring and the outer ring 22 is a fixed ring, for example. However, the outer ring 22 may be a rotating ring, and the inner ring 21 may be a fixed ring. In this case, the lubrication unit 40 is fixed to the inner ring 21. The lubrication unit 40 described above includes the circuit section 44 and the power supply section 45 inside the holder 41. However, one or both of the circuit section 44 and the power supply section 45 may be provided outside the holder 41. In this case, the pump 43 in the holder 41 is connected to the outside of the holder 41 via a cable. The bearing portion 20 may be a bearing other than the ball bearing, and may be a roller bearing in which rollers (cylindrical rollers or tapered rollers) are used as rolling elements.

According to the present invention, it is possible to refill the tank with the lubricant without disassembling the whole unit containing the rolling bearing apparatus and taking out the rolling bearing apparatus, which facilitates the maintenance work to refill the tank with the lubricant.

What is claimed is:

1. A rolling bearing apparatus comprising:
   a bearing portion having an inner ring, an outer ring, a plurality of rolling elements interposed between the inner ring and the outer ring, and a cage holding the rolling elements; and
   a lubrication unit provided adjacently to an annular space in an axial direction, the annular space being formed between the inner ring and the outer ring, the lubrication unit having a tank storing lubricant that is supplied to the annular space, wherein
   the tank has an outer wall on a radially outer side,
   a space formed on a radially inner side of the outer wall is a storage portion for storing the lubricant,
   an oil supply hole that is used to refill the storage portion with the lubricant is provided so as to pass through the outer wall,
   the oil supply hole is open to the radially outer side,
   the oil supply hole provided in the outer wall serves also as an air hole that prevents negative pressure in the storage portion caused by the lubricant flowing out of the tank, and
   the rolling bearing apparatus further comprises a channel that allows a radially outer space and the annular space to communicate with each other, the radially outer space communicating with the storage portion through the oil supply hole.

2. The rolling bearing apparatus according to claim 1, wherein
   the rolling bearing apparatus further comprises a frame body containing the tank of the lubrication unit,
   the frame body is provided with a through-hole, through which an opening portion of the oil supply hole on the radially outer side is exposed, and
   a diameter of the through-hole is larger than that of the oil supply hole.

3. A rolling bearing apparatus comprising:
   a bearing portion having an inner ring, an outer ring, a plurality of rolling elements interposed between the inner ring and the outer ring, and a cage holding the rolling elements; and
   a lubrication unit provided adjacently to an annular space in an axial direction, the annular space being formed between the inner ring and the outer ring, the lubrication unit having a tank storing lubricant that is supplied to the annular space, wherein
   the tank has an outer wall on a radially outer side,
   a space formed on a radially inner side of the outer wall is a storage portion for storing the lubricant,
   an oil supply hole that is used to refill the storage portion with the lubricant is provided so as to pass through the outer wall,
   the oil supply hole is open to the radially outer side, and
   the rolling bearing apparatus further comprises a channel that allows a radially outer space and the annular space to communicate with each other, the radially outer space communicating with the storage portion through the oil supply hole.

4. The rolling bearing apparatus according to claim 3, wherein
   the rolling bearing apparatus further comprises a frame body containing the tank of the lubrication unit, and
   the channel is a groove formed between the outer wall and the frame body, on the annular space side.

5. The rolling bearing apparatus according to claim 3, wherein
   the rolling bearing apparatus further comprises a frame body containing the tank of the lubrication unit,
   the frame body is provided with a through-hole, through which an opening portion of the oil supply hole on the radially outer side is exposed, and
   a diameter of the through-hole is larger than that of the oil supply hole.

6. The rolling bearing apparatus according to claim 4, wherein
   the frame body is provided with a through-hole, through which an opening portion of the oil supply hole on the radially outer side is exposed, and
   a diameter of the through-hole is larger than that of the oil supply hole.

* * * * *